United States Patent
Han et al.

(10) Patent No.: US 8,700,086 B2
(45) Date of Patent: Apr. 15, 2014

(54) METHOD AND APPARATUS FOR POWER CONTROL

(75) Inventors: Guanglin Han, Beijing (CN); Wei Quan, Beijing (CN); Yi Jiang, Beijing (CN); Qiao Zhang, Beijing (CN); Wurong Zhang, Beijing (CN); Zhongbin Qin, Athens (GR)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/289,480

(22) Filed: Nov. 4, 2011

(65) Prior Publication Data

US 2012/0052903 A1    Mar. 1, 2012

Related U.S. Application Data

(63) Continuation of application No. PCT/CN2010/079935, filed on Dec. 17, 2010.

(30) Foreign Application Priority Data

Dec. 30, 2009   (CN) .......................... 2009 1 0238852
Jan. 8, 2010    (CN) .......................... 2010 1 0002390
Nov. 5, 2010    (CN) .......................... 2010 1 0533454

(51) Int. Cl.
     *H04B 7/00*     (2006.01)
(52) U.S. Cl.
     USPC ........................... 455/522; 455/69; 370/318
(58) Field of Classification Search
     USPC ..................... 455/69, 522; 370/318
     See application file for complete search history.

(56) References Cited

U.S. PATENT DOCUMENTS

| | | | |
|---|---|---|---|
| 7,054,293 B2 * | 5/2006 | Tiedemann et al. | .......... 370/335 |
| 2007/0097962 A1 | 5/2007 | Yoon et al. | |
| 2008/0037413 A1 | 2/2008 | Gu et al. | |
| 2008/0084848 A1 | 4/2008 | Jard et al. | |

(Continued)

FOREIGN PATENT DOCUMENTS

| | | |
|---|---|---|
| CN | 1829370 (A) | 9/2006 |
| CN | 101340622 (A) | 1/2009 |

(Continued)

OTHER PUBLICATIONS

International Search Authority related to Int'l Patent Application No. PCT/CN2010/079935; mailed on Mar. 17, 2011 for Huawei Tech Co. Ltd. (6 pgs.).

(Continued)

*Primary Examiner* — Raymond Dean
(74) *Attorney, Agent, or Firm* — Slater & Matsil, L.L.P.

(57) ABSTRACT

A power control method is provided, which is applicable to the communication field. The method includes: obtaining power headroom information of an aggregated carrier of a User Equipment (UE), where the aggregated carrier includes at least one component carrier group and at least one first carrier, or includes at least one component carrier group, or includes at least two first carriers, the component carrier group includes at least two second carriers, and the first carrier and the second carrier are single carriers; and adjusting transmit power of the aggregated carrier according to the power headroom information. The method enables reporting of power headroom of an aggregated carrier of the UE in a multi-carrier scenario, so that the base station can control the transmitting power of the UE reliably, and therefore, reliability and throughput of the system are improved.

14 Claims, 9 Drawing Sheets

(56) References Cited

U.S. PATENT DOCUMENTS

| | | | |
|---|---|---|---|
| 2009/0175187 A1 | 7/2009 | Jersenius | |
| 2009/0318180 A1 | 12/2009 | Yi et al. | |
| 2010/0093386 A1 | 4/2010 | Damnjanovic et al. | |
| 2010/0158147 A1* | 6/2010 | Zhang et al. | 375/260 |
| 2010/0296471 A1* | 11/2010 | Heo et al. | 370/329 |
| 2011/0038271 A1* | 2/2011 | Shin et al. | 370/252 |
| 2012/0146323 A1 | 6/2012 | Schilling et al. | |

FOREIGN PATENT DOCUMENTS

| | | |
|---|---|---|
| CN | 101340712 A | 1/2009 |
| CN | 101529831 (A) | 9/2009 |
| CN | 101594631 (A) | 12/2009 |
| JP | 2012532351 A | 12/2012 |
| WO | WO-2008/155469 A1 | 12/2008 |
| WO | WO-2011/079729 A1 | 7/2011 |
| WO | WO 2011/079729 A1 | 7/2011 |

OTHER PUBLICATIONS

Written Opinion of the International Searching Authority (translation), issued in related Application No. PCT/CN2010/079935 (12 pgs.).

3GPP TSG RAN WG1 Meeting #58, Shenzhen, China, Aug. 24-28, 2009; R1-093297; Title: Uplink Power Control for Carrier Aggregation; Source: Research In Motion UK Limited; Agenda Item: 15.4; Document For: Discussion and Decision (3 pgs.).

3GPP TSG RAN WG1 #58 Meeting; Shenzhen, China, Aug. 24-28, 2009; R1-093322; Source: Nokia Siemens Networks, Nokia; Title: Uplink Power Control for LTE-Advanced; Agenda Item: 15.4; Document for: Discussion and Decision (4 pgs.).

3GPP TS 36.101 V10.0.0 (Oct. 2010); Technical Specification 3rd Generation Partnership Project; Technical Specification Group Radio Access Network; Evolved Universal Terrestrial Radio Access (E-UTRA); User Equipment (UE) Radio Transmission and Reception; (Release 10) (188 pgs).

3GPP TS 36.133 V10.0.0 (Oct. 2010); Technical Specification $3^{rd}$ Generation Partnership Project; Technical Specification Group Radio Access Network; Evolved Universal Terrestrial Radio Access (E-UTRA); Requirements for Support of Radio Resource Management (Release 10) (389 pgs.).

3GPP TS 36.213 V10.0.0 (Dec. 2010); Technical Specification $3^{rd}$ Generation Partnership Project; Technical Specification Group Radio Access Network; Evolved Universal Terrestrial Radio Access (E-UTRA); Physical Layer Procedures (Release 10) (98 pgs.).

3GPP TS 36.300 V10.0.0 (Jun. 2010); Technical Specification; $3^{rd}$ Generation Partnership Project; Technical Specification Group Radio Access Network; Evolved Universal Terrestrial Radio Access Network (E-UTRA) and Evolved Universal Terrestrial Radio Access Network (E-UTRAN); Overall Description; Stage 2 (Release 10) (183 pgs.).

3GPP TSG-RAN2 Meeting #71bis; Xian, China, Oct. 11-15, 2010; R2-105960; Change Request (52 pgs.).

3GPP TS 36.321 V.10.0.0 (Dec. 2010); Technical Specification; $3^{rd}$ Generation Partnership Project; Technical Specification Group Radio Access Network; Evolved Universal Terrestrial Radio Access (E-UTRA); Medium Access Control (MAC) Protocol Specification (Release 10) (53 pgs.).

3GPP TS 36.331 V.9.0.0 (Sep. 2009); Technical Specification; $3^{rd}$ Generation Partnership Project; Technical Specification Group Radio Access Network; Evolved Universal Terrestrial Radio Access (E-UTRA); Radio Resource Control (RRC); Protocol Specification (Release 10) (213 pgs.).

Search report issued in corresponding EP application No. 10840518.4, dated Jan. 28, 2013, total 6 pages.

Samsung, "UL Translation Power Control in LTE-A," 3GPP TSG RAN WG1 #56bis, R1-091250, Mar. 23-27, 2009, total 6 pages.

$3^{rd}$ Generation Partnership Project; Technical Specification Group Radio Access Network; Evolved Universal Terrestrial Radio Access (E-UTRA) Radio Resource Control (RRC); Protocol specification (Release 9), 3GPP TS 36.331 V9.0.0, Sep. 2009, 213 pages.

$3^{rd}$ Generation Partnership Project; Technical Specification Group Radio Access Network; Evolved Universal Terrestrial Radio Access (E-UTRA); Medium Access Control (MAC) protocol specification (Release 10), 3GPP TS 36.321, V10.0.0, Dec. 2010, 53 pages.

$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), 3GPP TS 36.300, V10.0.0, Jun. 2010, 183 pages.

$3^{rd}$ Generation Partnership Project; Technical Specification Group Radio Access Network; Evolved Universal Terrestrial Radio Access (E-UTRA); Physical layer procedures (Release 10), 3GPP TS 36.213 V10.0.0, Dec. 2010, 98 pages.

$3^{rd}$ Generation Partnership Project; Technical Specification Group Radio Access Network; Evolved Universal Terrestrial Radio Access (E-UTRA); Requirements for support of radio resource management (Release 10), 3GPP TS 36.133 V10.0.0, Dec. 2010, 389 pages.

$3^{rd}$ Generation Partnership Project; Technical Specification Group Radio Access Network; Evolved Universal Terrestrial Radio Access (E-UTRA); User Equipment (UE) radio transmission and reception (Release 10), 3GPP TS 36.101 V10.0.0, Dec. 2010, 188 pages.

Ericsson, "Introduction of Carrier Aggregation," 3GPP TSG-RAN2 Meeting #71bis, R2-105960, Xian, China, Oct. 11-15, 2010, 52 pages.

Nokia, "Uplink Power Control for LTE-Advanced," 3GPP TSG RAN WG1 #58 Meeting, R1-093322, Shenzhen, China, Aug. 24-28, 2009, 4 pages.

Research in Motion UK Limited, "Uplink Power Control for Carrier Aggregation," 3GPP TSG RAN WG1 Meeting #58, R1-093297, Shenzhen, China, Aug. 24-28, 2009, 3 pages.

Written Opinion of the International Searching Authority, received in Application No. PCT/CN2010/079935, mailed Mar. 17, 2011, 6 pages.

Ericsson, et al., "DC-HSUPA-Measurement definitions," 3GPP TSG RAN WG1 Meeting #57bis, R1-092765, Los Angeles, CA, USA, Jun. 29-Jul. 3, 2009, 2 pages.

LG Electronics, "Uplink transmission under UE transmit power limitation in LTE-Advanced," 3GPP TSG RAN WG1 #58, R1-093250, Shenzhen, China, Aug. 24-28, 2009, 3 pages.

Japanese Office Action received in Application No. 2012-546331 mailed Dec. 3, 2013, 9 pages.

Nokia Siemens Networks, et al., "Way forward on LTE-A UL PC," 3GPP TSG RAN WG1 #58bis, R1-094387, Miyazaki, Japan, Oct. 12-16, 2009, 3 pages.

Catt, "Impact of carrier aggregation on MAC layer," 3GPP TSG-RAN WG2 #67bis, R2-095484, Miyazaki, Japan, Oct. 12-16, 2009, 5 pages.

* cited by examiner

METHOD AND APPARATUS FOR POWER CONTROL

CROSS-REFERENCE TO RELATED APPLICATIONS

This application is a continuation of International Application No. PCT/CN2010/079935, filed on Dec. 17, 2010, which claims priorities to Chinese Patent Application No. 200910238852.3, filed on Dec. 30, 2009, Chinese Patent Application No. 201010002390.8, filed on Jan. 8, 2010, and Chinese Patent Application No. 201010533454.7, filed on Nov. 5, 2010. This application also claims priority to Chinese Patent Application No. 201010533454.7, filed on Nov. 5, 2010. All of above-mentioned applications are hereby incorporated by reference in their entireties.

FIELD OF THE INVENTION

The present invention relates to communication technologies, and in particular, to a power control technology.

BACKGROUND OF THE INVENTION

The Long Term Evolved-Advanced (LTE-Advance) network is a communication network actively developed by manufacturers, which is enhancement to the LTE network, and is designed to provide a cost-efficient network capable of reducing delay, increasing the user data rate, and improving the system capacity and coverage.

The LTE technology supports fast scheduling and link adaptability. Therefore, an LTE network can allocate time-frequency resources according to transient requirements of a user and the channel state. In the uplink scheduling technology, because the LTE network can split a frequency domain resources into multiple bands, the LTE network can schedule resources for more than one User Equipment (UE) on the same subframe.

Generally, it is better not to overuse the transmitting power of the UE in order to prolong the battery life of the UE and reduce intra-cell and inter-cell interference. An LTE system accomplishes such purposes by supporting power control exercised by a base station on the UE.

In a carrier aggregation scenario, a UE may work on multiple uplink carriers or multiple downlink carriers simultaneously. The prior art provides no solution to reporting power headroom of an aggregated carrier in a carrier aggregation scenario, which makes the base station unable to control the transmitting power of the UE reliably.

SUMMARY OF THE INVENTION

Embodiments of the present invention provide a power control method to report power headroom of multiple carriers of a UE in a multi-carrier scenario, which solves the problem of inability of reporting power headroom of multiple carriers in a carrier aggregation scenario in the prior art.

A power control method provided in an embodiment of the present invention includes:

obtaining power headroom information of an aggregated carrier of a UE, where the aggregated carrier includes at least one component carrier group and at least one first carrier, or include at least one component carrier group, or include at least two first carriers, the component carrier group includes at least two second carriers, and the first carrier and the second carrier are single carriers; and adjusting transmitting power of the aggregated carrier according to the power headroom information.

A base station provided in an embodiment of the present invention includes:

an obtaining module, configured to obtain power headroom information of an aggregated carrier of a UE, where the aggregated carrier includes at least one component carrier group and at least one first carrier, or include at least one component carrier group, or include at least two first carriers, the component carrier group includes at least two second carriers, and the first carrier and the second carrier are single carriers; and a power adjusting module, configured to adjust transmitting power of the aggregated carrier according to the power headroom information obtained by the obtaining module.

A UE provided in an embodiment of the present invention includes:

a generating module, configured to generate power headroom information of an aggregated carrier of the UE, where the aggregated carrier include at least one component carrier group and at least one first carrier, or include at least one component carrier group, or include at least two first carriers, the component carrier group includes at least two second carriers, and the first carrier and the second carrier are single carriers; and a sending module, configured to send the power headroom information generated by the generating module to a base station so that the base station adjusts transmitting power of the aggregated carrier according to the power headroom information.

The embodiments of the present invention enable reporting of power headroom of an aggregated carrier of the UE in a multi-carrier scenario, so that the base station can control the transmitting power of the UE reliably, and therefore, reliability and throughput of the system are improved.

DETAILED DESCRIPTION OF THE EMBODIMENTS

The following describes how a UE reports power headroom in a carrier aggregation scenario, taking an LTE system as an example.

In the following embodiments, the aggregated carrier may include at least one component carrier group and at least one first carrier, or include at least one component carrier group, or include at least two first carriers, the component carrier group includes at least two second carriers, and the first carrier and the second carrier are single carriers.

Figure 1:
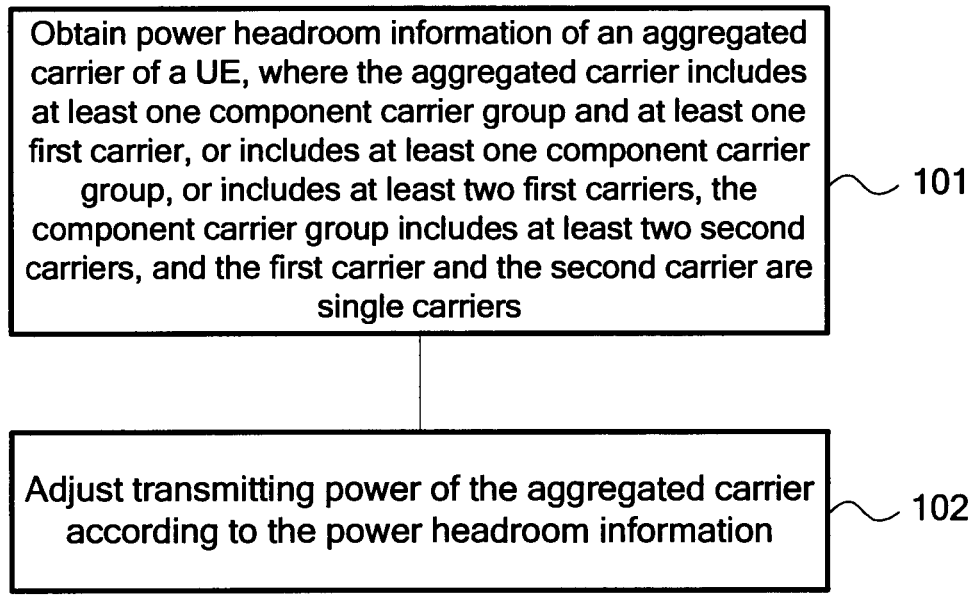
FIG. 1 is a flowchart of a power control method provided in an embodiment of the present invention.

The following describes a power control method provided in an embodiment of the present invention with reference to FIG. 1. As shown in FIG. 1, the method includes the following steps:

Step 101: Obtain power headroom information of an aggregated carrier of a UE, where the aggregated carrier includes at least one component carrier group and at least one first carrier, or include at least one component carrier group, or include at least two first carriers, the component carrier group includes at least two second carriers, and the first carrier and the second carrier are single carriers.

Step 102: Adjust transmitting power of the aggregated carrier according to the power headroom information.

Through the method provided in the foregoing embodiment, power headroom of multiple carriers of the UE can be reported in a multi-carrier scenario, so that the base station can control the transmitting power of the UE reliably, and therefore, reliability and throughput of the system are improved.

Figure 2:
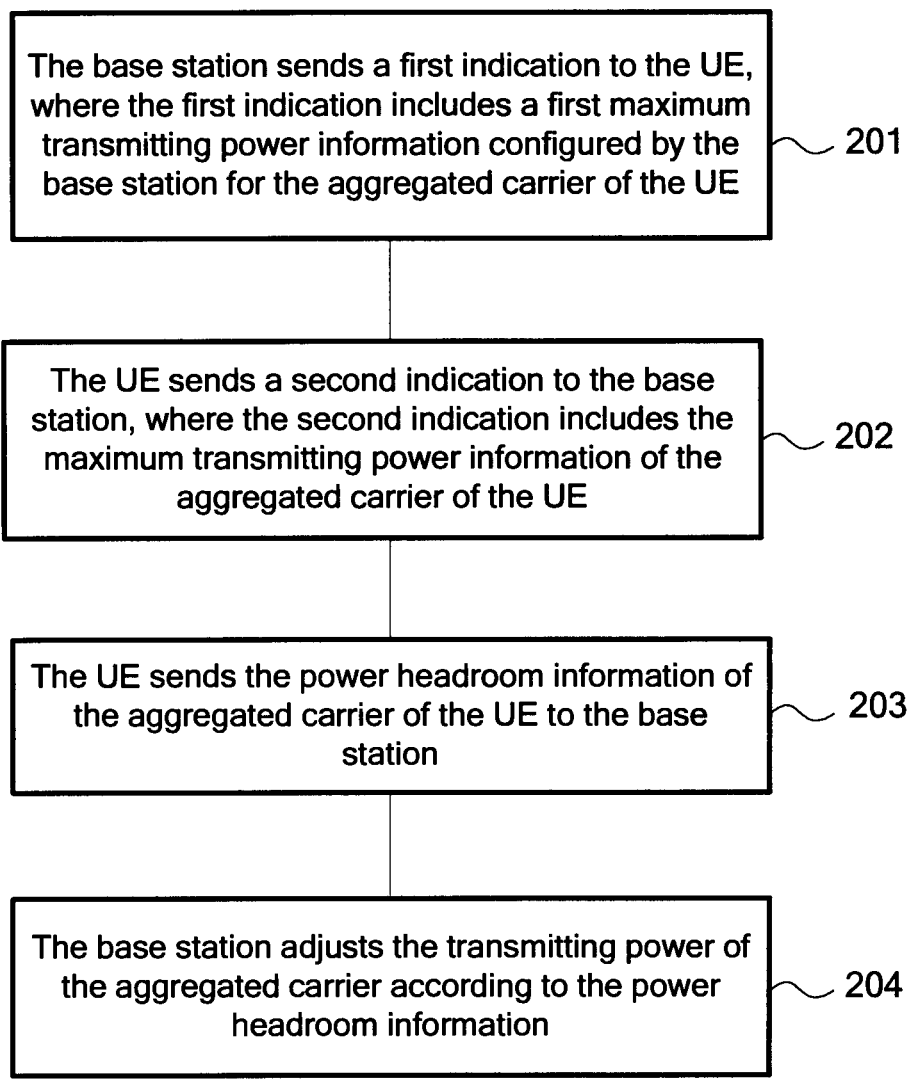
FIG. 2 is a flowchart of another power control method provided in an embodiment of the present invention.

The following describes a power control method provided in an embodiment of the present invention with reference to FIG. 2. As shown in FIG. 2, the method includes the following steps:

Step 201: The base station sends a first indication information to the UE. The first indication information includes a first maximum transmitting power information configured by the base station for the aggregated carrier of the UE.

The first maximum transmitting power information configured by the base station for the aggregated carrier of the UE may be a sum configured by the base station of maximum transmitting power of single carriers included in the aggregated carrier of the UE, or a sum configured by the base station of maximum transmitting power of single carriers included in the aggregated carrier that are aggregated on the same antenna of the UE, or a sum configured by the base station of maximum transmitting power of single carriers included in the aggregated carrier which are related to the same band of the UE, or a sum configured by the base station of maximum transmitting power of single carriers included in the aggregated carrier which are aggregated on the same power amplifier of the UE, or maximum transmitting power configured by the base station for each single carrier included in the aggregated carrier of the UE.

The first indication information may include one or more messages.

Optionally, in step 202, the UE sends a second indication information to the base station. The second indication information is used to send the maximum transmitting power information of the aggregated carrier of the UE to the base station. The maximum transmitting power information may be: the smaller one of a sum configured by the base station of maximum transmitting power of single carriers included in the aggregated carrier of the UE and nominal maximum transmitting power of the UE; or, the smaller one of a sum configured by the base station of maximum transmitting power for single carriers included in the aggregated carrier which are aggregated on the same antenna of the UE and maximum transmitting power of the antenna of the UE; or, the smaller one of a sum configured by the base station of maximum transmitting power of single carriers included in the aggregated carrier which are attributable to the same band of the UE and maximum transmitting power of the band of the UE; or, the smaller one of a sum configured by the base station of maximum transmitting power of single carriers included in the aggregated carrier which are aggregated on the same power amplifier of the UE and the maximum transmitting power of the power amplifier of the UE; or, the maximum transmitting power information maybe nominal maximum transmitting power of the UE.

Step 203: The UE sends the power headroom information of the aggregated carrier of the UE to the base station.

The UE obtains the maximum transmitting power of the aggregated carrier according to the first maximum transmitting power information configured by the base station for the aggregated carrier of the UE, and according to a second maximum transmitting power information of the aggregated carrier supported by the UE; the UE obtains the power headroom information of the aggregated carrier according to the maximum transmitting power of the aggregated carrier and estimated transmitting power of the aggregated carrier, and sends the power headroom information to the base station.

Specifically, the UE uses the following value as the maximum transmitting power of the aggregated carrier: the smaller one of a sum configured by the base station of maximum transmitting power of single carriers included in the aggregated carrier of the UE and nominal maximum transmitting power of the UE; optionally, the smaller one of a weighting result of the sum of the maximum transmitting power configured by the base station for single carriers included in the aggregated carrier of the UE and the nominal maximum transmitting power of the UE; and The UE uses the following value as the power headroom information of the aggregated carrier: the maximum transmitting power of the aggregated carrier minus a sum of estimated transmitting power of single carriers included in the aggregated carrier of the UE; optionally the maximum transmitting power of the aggregated carrier may be a weighting result of the maximum transmitting power of the aggregated carrier, and a sum of estimated transmitting power of single carriers included in the aggregated carrier of the UE may be a weighting result of a sum of estimated transmitting power of single carriers included in the aggregated carrier of the UE.

Alternatively, the UE uses the following value as the maximum transmitting power of the aggregated carrier: the smaller one of a sum configured by the base station of maximum transmitting power of single carriers included in the aggregated carrier which are aggregated on the same antenna of the UE and maximum transmitting power of the antenna of the UE; or, the sum configured by the base station of the maximum transmitting power of single carriers included in the aggregated carrier which are aggregated on the same antenna of the UE may be a weighting result of the sum configured by the base station of the maximum transmitting power of single carriers included in the aggregated carrier which are aggregated on the same antenna of the UE, and the maximum transmitting power of the antenna of the UE may be a weighting result of the maximum transmitting power of the antenna of the UE; and The UE uses the following value as the power headroom information of the aggregated carrier: the maximum transmitting power of the aggregated carrier minus the estimated transmitting power of the antenna of the UE; or, the maximum transmitting power of the aggregated carrier may be a weighting result of the maximum transmitting power of the aggregated carrier, the estimated transmitting power of the antenna of the UE may be a weighting result of the estimated transmitting power of the antenna of the UE.

Alternatively, the UE uses the following value as the maximum transmitting power of the aggregated carrier: the smaller one of a sum configured by the base station of maximum transmitting power of single carriers included in the aggregated carrier which are attributable to the same band of the UE and the maximum transmitting power of the band of the UE; or, the sum configured by the base station of the maximum transmitting power of single carriers included in the aggregated carrier which are attributable to the same band of the UE may be a weighting result of the sum configured by the base station of the maximum transmitting power of single carriers included in the aggregated carrier which are attributable to the same band of the UE, or the maximum transmitting power of the band of the UE may be a weighting result of the maximum transmitting power of the band of the UE; and The UE uses the following value as the power headroom information of the aggregated carrier the maximum transmitting power of the aggregated carrier minus the estimated transmitting power of the single carriers included in the aggregated carrier attributable to the band of the UE; or, the maximum transmitting power of the aggregated carrier may be a weighting result of the maximum transmitting power of the aggregated carrier, and the estimated transmitting power of the single carriers included in the aggregated carrier attributable to the band of the UE may be a weighting result of the estimated transmitting power of the single carriers included in the aggregated carrier attributable to the band of the UE.

Alternatively, the UE uses the following value as the maximum transmitting power of the aggregated carrier: the smaller one of a sum configured by the base station of the maximum transmitting power for single carriers included in the aggregated carrier which are aggregated on the same power amplifier of the UE and the maximum transmitting power of the power amplifier of the UE; or, the sum configured by the base station of the maximum transmitting power of single carriers included in the aggregated carrier which are aggregated on the same power amplifier of the UE may be a weighting result of the sum configured by the base station of the maximum transmitting power of single carriers included in the aggregated carrier which are aggregated on the same power amplifier of the UE, and the maximum transmitting power of the power amplifier of the UE may be a weighting result of the maximum transmitting power of the power amplifier of the UE; and The UE uses the following value as the power headroom information of the aggregated carrier: the maximum transmitting power of the aggregated carrier minus the estimated transmitting power of the single carriers included in the aggregated carrier which are aggregated on the same power amplifier of the UE; or, the maximum transmitting power of the aggregated carrier may be a weighting result of the maximum transmitting power of the aggregated carrier, and the estimated transmitting power of the single carriers included in the aggregated carrier which are aggregated on the same power amplifier of the UE may be a weighting result of the estimated transmitting power of the single carriers included in the aggregated carrier which are aggregated on the same power amplifier of the UE.

The UE uses the following value as the maximum transmitting power of each single carrier the smaller one of the maximum transmitting power configured by the base station for each single carrier included in the aggregated carrier of the UE and the nominal maximum transmitting power of the UE; or, the smaller one of the maximum transmitting power configured by the base station for each single carrier included in the aggregated carrier of the UE and the maximum transmitting power of a first antenna of the UE; or, the smaller one of the maximum transmitting power configured by the base station for each single carrier included in the aggregated carrier of the UE and the maximum transmitting power of a first band of the UE; or, the smaller one of the maximum transmitting power configured by the base station for each single carrier included in the aggregated carrier of the UE and the maximum transmitting power of a first power amplifier of the UE; or, a weighting result of the former term specified in the foregoing four scenarios, or a weighting result of the latter term specified in the foregoing four scenarios, whichever is smaller; and The UE uses the following value as the power headroom information of each single carrier: the maximum transmitting power of each single carrier minus the estimated transmitting power of the corresponding single carrier; or, the maximum transmitting power of each single carrier may be a weighting result of the maximum transmitting power of each single carrier and the estimated transmitting power of the corresponding single carrier may be a weighting result of the estimated transmitting power of the corresponding single carrier, and then uses the power headroom information of each single carrier as the power headroom information of the aggregated carrier.

If the control channel and the data channel of the UE can send information simultaneously, the transmitting power may be the sum of the transmitting power of the control channel and the transmitting power of the data channel, or may be the transmitting power of the control channel or the transmitting power of the data channel.

If the control channel and the data channel of the UE are unable to send information simultaneously, the transmitting power includes the transmitting power of the control channel or the transmitting power of the data channel The following describes how the UE sends the power headroom information to the base station.

When the aggregated carrier includes at least one first carrier and at least one component carrier group, or includes at least two first carriers, the power headroom information of the component carriers may be obtained on the first carrier, where the power headroom information is sent by the UE on one first carrier or two first carriers; or When the aggregated carrier includes at least one first carrier and at least one component carrier group, or includes at least one component carrier group, the power headroom information of the component carrier group may be obtained on the second carrier in the component carrier group, where the power headroom information is sent by the UE; or When the aggregated carrier includes at least two first carriers, the power headroom information of one first carrier may be obtained on the other first carrier, where the power headroom information is sent by the UE; or When the aggregated carrier includes at least one first carrier and at least one component carrier group, the power headroom information of the component carrier group may be obtained on the first carrier, or the power headroom information of the component carrier may be obtained on the second component carrier in the component carrier group, where the power headroom information is sent by the UE; or When the aggregated carrier includes at least two component carrier groups, the power headroom information of other component carrier groups may be obtained on the second carrier in the component carrier group, where the power headroom information is sent by the UE; or When the aggregated carrier includes at least one first carrier and at least one component carrier group, the power headroom information of each first carrier and the power headroom information of each component carrier group may be obtained on the first carrier; or, When the aggregated carrier includes at least two first carriers, the power headroom information of each first carrier may be obtained on the first carrier; or, When the aggregated carrier includes at least one component carrier group, the power headroom information of each component carrier group may be obtained on the second carrier in the component carrier group, where the power headroom information is sent by the UE.

Step 204: The base station adjusts the transmitting power of the aggregated carrier according to the power headroom information.

The step of adjusting the transmitting power of the aggregated carrier according to the power headroom information includes:

When the aggregated carrier includes at least one first carrier and at least one component carrier group, the base station adjusts the transmitting power of at least one first carrier and the transmitting power of at least one component carrier group in the aggregated carrier according to the power headroom information; or When the aggregated carrier includes at least two second carriers, the base station adjusts the transmitting power of the at least two second carriers according to the power headroom information; or When the aggregated carrier includes at least one component carrier group, the base station adjusts the transmitting power of the at least one component carrier group according to the power headroom information.

Through the method provided in the foregoing embodiment, power headroom of multiple carriers of the UE can be reported in a multi-carrier scenario, so that the base station can control the transmitting power of the UE reliably, and therefore, reliability and throughput of the system are improved.

Figure 3:
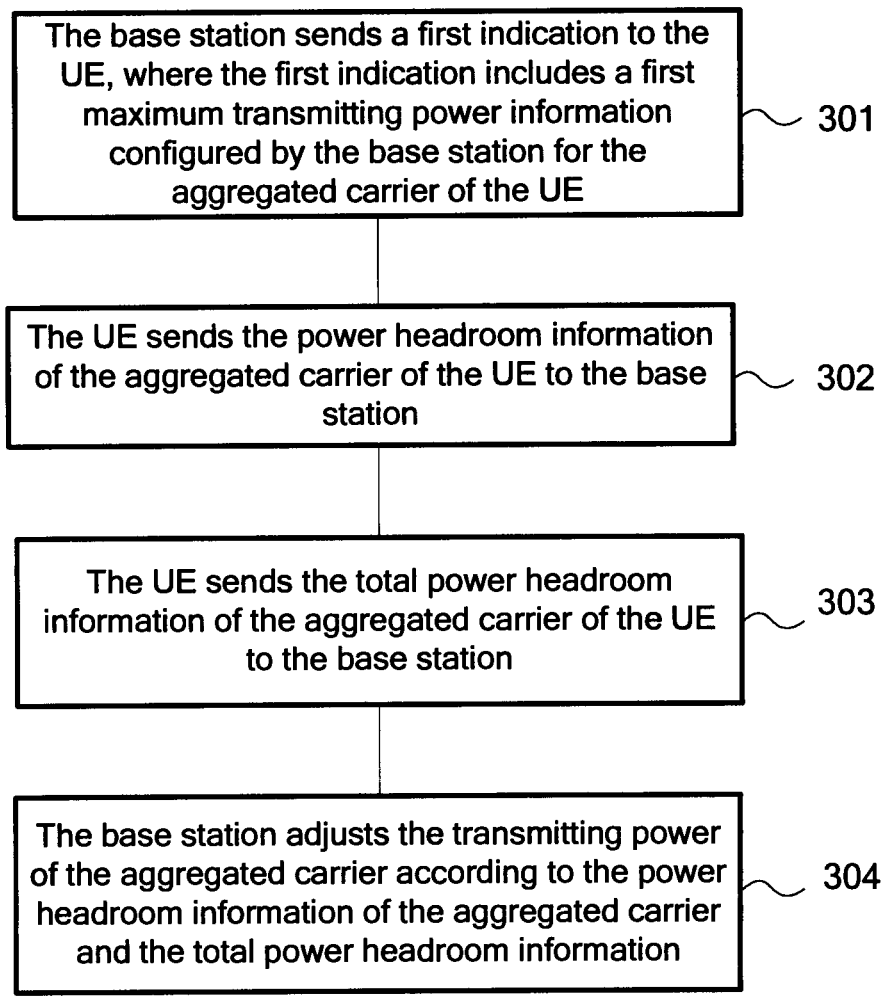
FIG. 3 is a flowchart of another power control method provided in an embodiment of the present invention.

The following describes a power control method provided in an embodiment of the present invention with reference to FIG. 3. As shown in FIG. 3, the method includes the following steps:

Step 301 is the same as step 201, and step 302 is the same as step 203. For details, see the second embodiment.

Step 303: The UE sends the total power headroom information of the aggregated carrier of the UE to the base station.

The total power headroom information includes a difference between nominal maximum transmitting power of the UE and the sum of estimated transmitting power of the single carriers included in the aggregated carrier of the UE; or, includes a difference between the smaller one of the following value and the sum of estimated transmitting power of the single carriers included in the aggregated carrier of the UE: a sum of the maximum transmitting power configured by the base station for single carriers included in the aggregated carrier of the UE and a sum of the maximum transmitting power of single carriers included in the aggregated carrier supported by the UE.

The UE may send the total power headroom information to the base station on the first carrier of the aggregated carrier, or on the second carrier of the component carrier group, or send the total power headroom information to the base station while sending the power headroom information of the aggregated carrier.

Step 304: The base station adjusts the transmitting power of the aggregated carrier according to the power headroom information of the aggregated carrier and the total power headroom information.

The step of adjusting the transmitting power of the aggregated carrier according to the power headroom information and the total power headroom information includes:

When the aggregated carrier includes at least one first carrier and at least one component carrier group, the base station adjusts the transmitting power of at least one first carrier and the transmitting power of at least one component carrier group in the aggregated carrier according to the power headroom information and the total power headroom information; or When the aggregated carrier includes at least two second carriers, the base station adjusts the transmitting power of the at least two second carriers according to the power headroom information and the total power headroom information; or When the aggregated carrier includes at least one component carrier group, the base station adjusts the transmitting power of the at least one component carrier group according to the power headroom information and the total power headroom information.

Through the method provided in the foregoing embodiment, power headroom of multiple carriers of the UE can be reported in a multi-carrier scenario, so that the base station can control the transmitting power of the UE reliably, and therefore, reliability and throughput of the system are improved.

Figure 4:
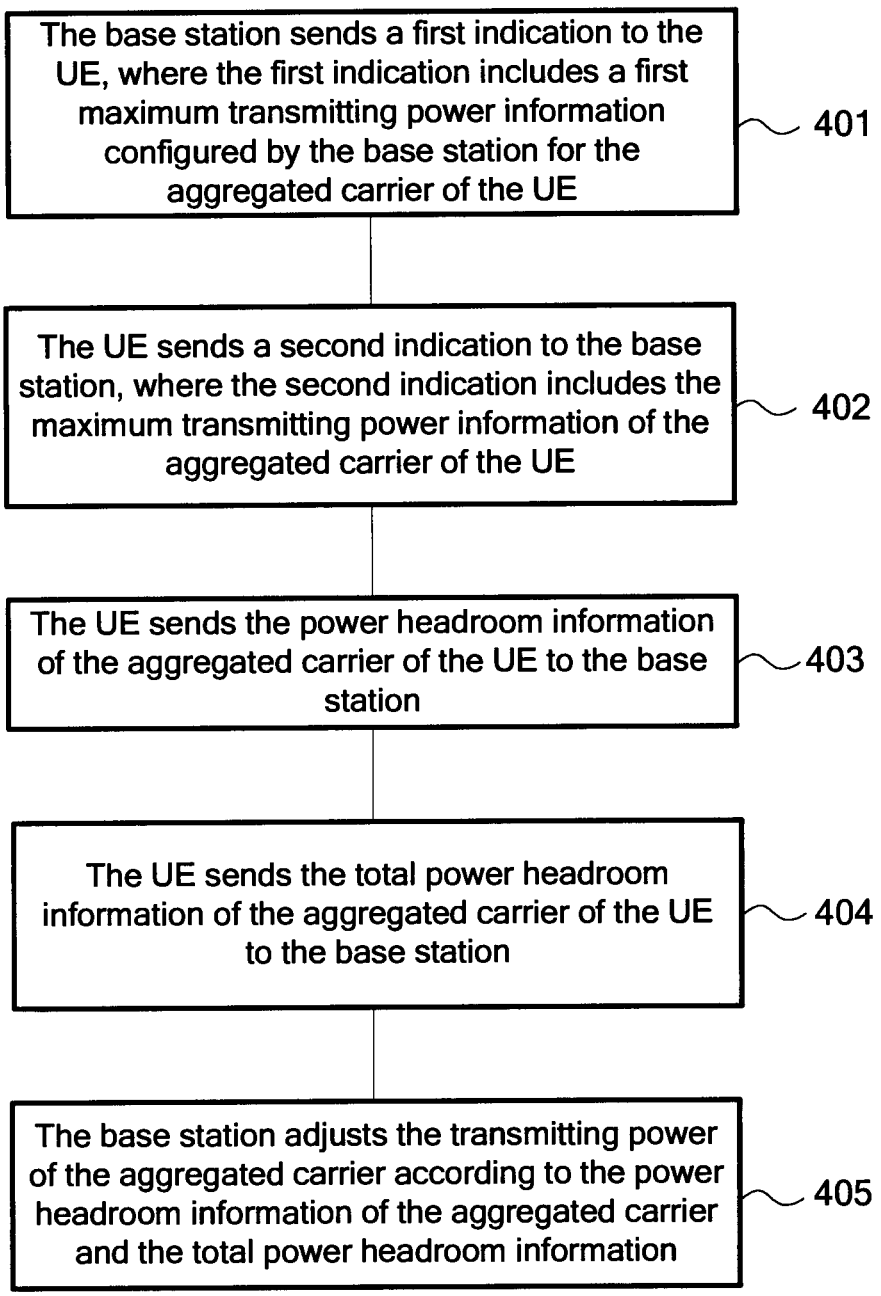
FIG. 4 is a flowchart of another power control method provided in an embodiment of the present invention.

The following describes a power control method provided in an embodiment of the present invention with reference to FIG. 4. As shown in FIG. 4, the method includes the following steps:

Step 401 is the same as step 201. For details, see the second embodiment.

Step 402 is the same as step 202. For details, see the second embodiment.

Step 403 is the same as step 203. For details, see the second embodiment.

Step 404 is the same as step 303. For details, see the third embodiment.

Step 405 is the same as step 304. For details, see the third embodiment.

Through the method provided in the foregoing embodiment, power headroom of multiple carriers of the UE can be reported in a multi-carrier scenario, so that the base station can control the transmitting power of the UE reliably, and therefore, reliability and throughput of the system are improved.

Figure 5:
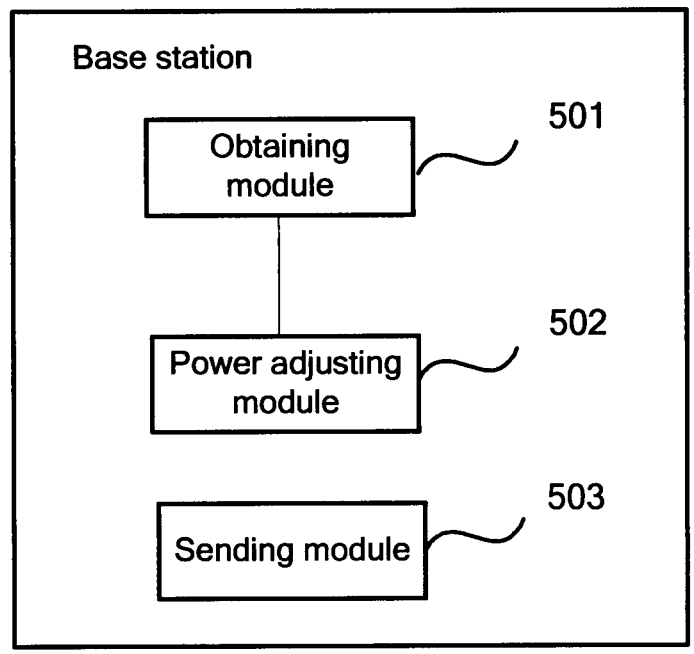
FIG. 5 is a schematic structure diagram of a base station provided in an embodiment of the present invention.

The following describes a base station provided in an embodiment of the present invention with reference to FIG. 5. As shown in FIG. 5, the base station includes:

an obtaining module 501, configured to obtain power headroom information of an aggregated carrier of a UE, where the aggregated carrier includes at least one component carrier group and at least one first carrier, or includes at least one component carrier group, or includes at least two first carriers, the component carrier group includes at least two second carriers, and the first carrier and the second carrier are single carriers; and a power adjusting module 502, configured to adjust transmitting power of the aggregated carrier according to the power headroom information obtained by the obtaining module 501.

The base station further includes:

a sending module 503, configured to send a first indication information to the UE, where the first indication information includes a first maximum transmitting power information configured by the base station for the aggregated carrier of the UE, and therefore, the UE can obtain the maximum transmitting power of the aggregated carrier according to the first maximum transmitting power information and the second maximum transmitting power information of the aggregated carrier supported by the UE, and the UE can obtain the power headroom information of the aggregated carrier according to the maximum transmitting power of the aggregated carrier and the estimated transmitting power of the aggregated carrier, and send the power headroom information to the base station.

The obtaining module 501 is further configured to obtain the total power headroom information of the aggregated carrier of the UE.

The total power headroom information includes a difference between nominal maximum transmitting power of the UE and the sum of estimated transmitting power of the single carriers included in the aggregated carrier of the UE; or, includes a difference between the smaller one of the following value and the sum of estimated transmitting power of the single carriers included in the aggregated carrier of the UE: a sum of the maximum transmitting power configured by the base station for single carriers included in the aggregated carrier of the UE and a sum of the maximum transmitting power of single carriers included in the aggregated carrier supported by the UE.

The power adjusting module 502 is further configured to adjust the transmitting power of the aggregated carrier according to the power headroom information and the total power headroom information obtained by the obtaining module.

The base station may further include:

a second obtaining module, configured to obtain the maximum transmitting power information supported by the aggregated carrier of the UE; and a configuring module, configured to configure the maximum transmitting power for the aggregated carrier of the UE according to the maximum transmitting power information supported by the aggregated carrier of the UE obtained by the second obtaining module so that the UE can send the power headroom information of the aggregated carrier of the UE to the base station according to the configured maximum transmitting power.

Through the base station provided in the foregoing embodiment, power headroom of multiple carriers of the UE can be reported in a multi-carrier scenario, so that the base station can control the transmitting power of the UE reliably, and therefore, reliability and throughput of the system are improved.

Figure 6:
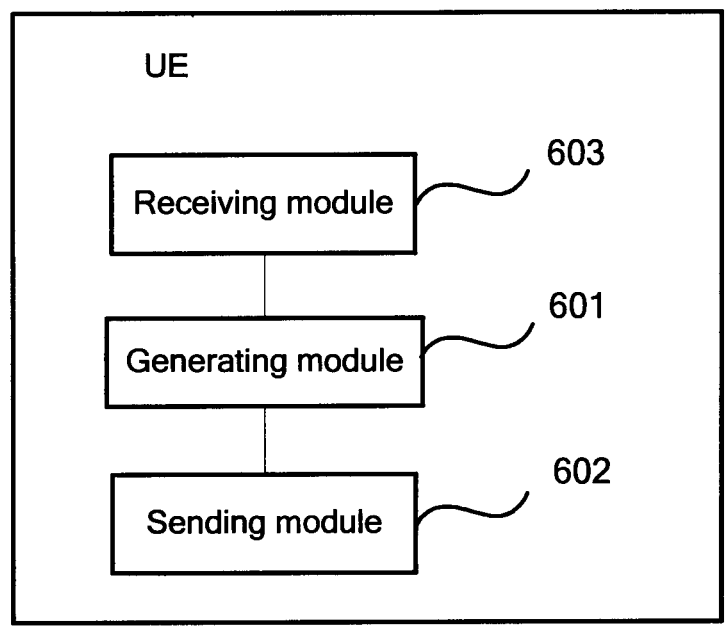
FIG. 6 is a schematic structure diagram of a UE provided in an embodiment of the present invention.

The following describes a UE provided in an embodiment of the present invention with reference to FIG. 6. As shown in FIG. 6, the UE includes:

a generating module 601, configured to generate power headroom information of an aggregated carrier of the UE, where the aggregated carrier include at least one component carrier group and at least one first carrier, or include at least one component carrier group, or include at least two first carriers, the component carrier group includes at least two second carriers, and the first carrier and the second carrier are single carriers; and a sending module 602, configured to send the power headroom information generated by the generating module 601 to a base station so that the base station adjusts transmitting power of the aggregated carrier according to the power headroom information.

The UE further includes:

a receiving module 603, configured to receive a first indication information from the base station, where the first indication information includes a first maximum transmitting power information configured by the base station for the aggregated carrier of the UE.

The generating module 601 includes:

a first calculating unit, configured to calculate the maximum transmitting power of the aggregated carrier according to the first maximum transmitting power information received by the receiving module 603 and the second maximum transmitting power information of the aggregated carrier supported by the UE; and a second calculating unit, configured to calculate the power headroom information of the aggregated carrier according to the maximum transmitting power calculated by the first calculating unit and the estimated transmitting power of the aggregated carrier, and send the power headroom information to the sending module 602.

The first calculating unit is specifically configured to use the following value as the maximum transmitting power of the aggregated carrier: the smaller one of the first maximum transmitting power information received by the receiving module 603 and the nominal maximum transmitting power of the UE, where the first maximum transmitting power information includes a sum of the maximum transmitting power of single carriers included in the aggregated carrier of the UE;

The second calculating unit is specifically configured to use the following value as the power headroom information of the aggregated carrier the maximum transmitting power of the aggregated carrier calculated by the first calculating unit minus the sum of estimated transmitting power of single carriers included in the aggregated carrier of the UE; or The first calculating unit is specifically configured to use the following value as the maximum transmitting power of the aggregated carrier: the smaller one of the first maximum transmitting power information received by the receiving module 603 and the maximum transmitting power of the antenna of the UE, where the first maximum transmitting power information includes a sum of the maximum transmitting power of single carriers included in the aggregated carrier which are aggregated on the same antenna of the UE;

The second calculating unit is specifically configured to use the following value the power headroom information of the aggregated carrier: the maximum transmitting power of the aggregated carrier calculated by the first calculating unit minus the estimated transmitting power of the antenna of the UE; or The first calculating unit is specifically configured to use the following value as the maximum transmitting power of the aggregated carrier: the smaller one of the first maximum transmitting power information received by the receiving module 603 and the maximum transmitting power of the band of the UE, where the first maximum transmitting power information includes a sum of the maximum transmitting power of single carriers included in the aggregated carrier which are attributable to the same band of the UE;

The second calculating unit is specifically configured to use the following value as the power headroom information of the aggregated carrier: the maximum transmitting power of the aggregated carrier calculated by the first calculating unit minus the estimated the transmitting power of single carriers included in the aggregated carrier on the same band of the UE; or The first calculating unit is specifically configured to use the following value as the maximum transmitting power of the aggregated carrier: the smaller one of the first maximum transmitting power information received by the receiving module 603 and the maximum transmitting power of the power amplifier of the UE, where the first maximum transmitting power information includes a sum of the maximum transmitting power of single carriers included in the aggregated carrier which are aggregated on the same power amplifier of the UE;

The second calculating unit is specifically configured to use the following value as the power headroom information of the aggregated carrier: the maximum transmitting power of the aggregated carrier calculated by the first calculating unit minus the estimated transmitting power of single carriers included in the aggregated carrier on the same power amplifier of the UE; or The first calculating unit is specifically configured to use the following value as the maximum transmitting power of each single carrier the smaller one of the first maximum transmitting power information received by the receiving module 603 and the nominal maximum transmitting power of the UE; or, the smaller one of the first maximum transmitting power information received by the receiving module 603 and the maximum transmitting power of the antenna of the UE; or, the smaller one of the first maximum transmitting power information received by the receiving module 603 and the maximum transmitting power of the band of the UE; or, the smaller one of the first maximum transmitting power information received by the receiving module 603 and the maximum transmitting power of the power amplifier of the UE, where the first maximum transmitting power information includes the maximum transmitting power of each single carrier in the aggregated carrier of the UE; and The second calculating unit is specifically configured to use the following value as the power headroom information of each single carrier: the maximum transmitting power of each single carrier calculated by the first calculating unit minus the estimated transmitting power of corresponding single carrier, and use the power headroom information of each single carrier as the power headroom information of the aggregated carrier.

Through the UE provided in the foregoing embodiment, power headroom of multiple carriers of the UE can be reported in a multi-carrier scenario, so that the base station can control the transmitting power of the UE reliably, and therefore, reliability and throughput of the system are improved.

Figure 7:
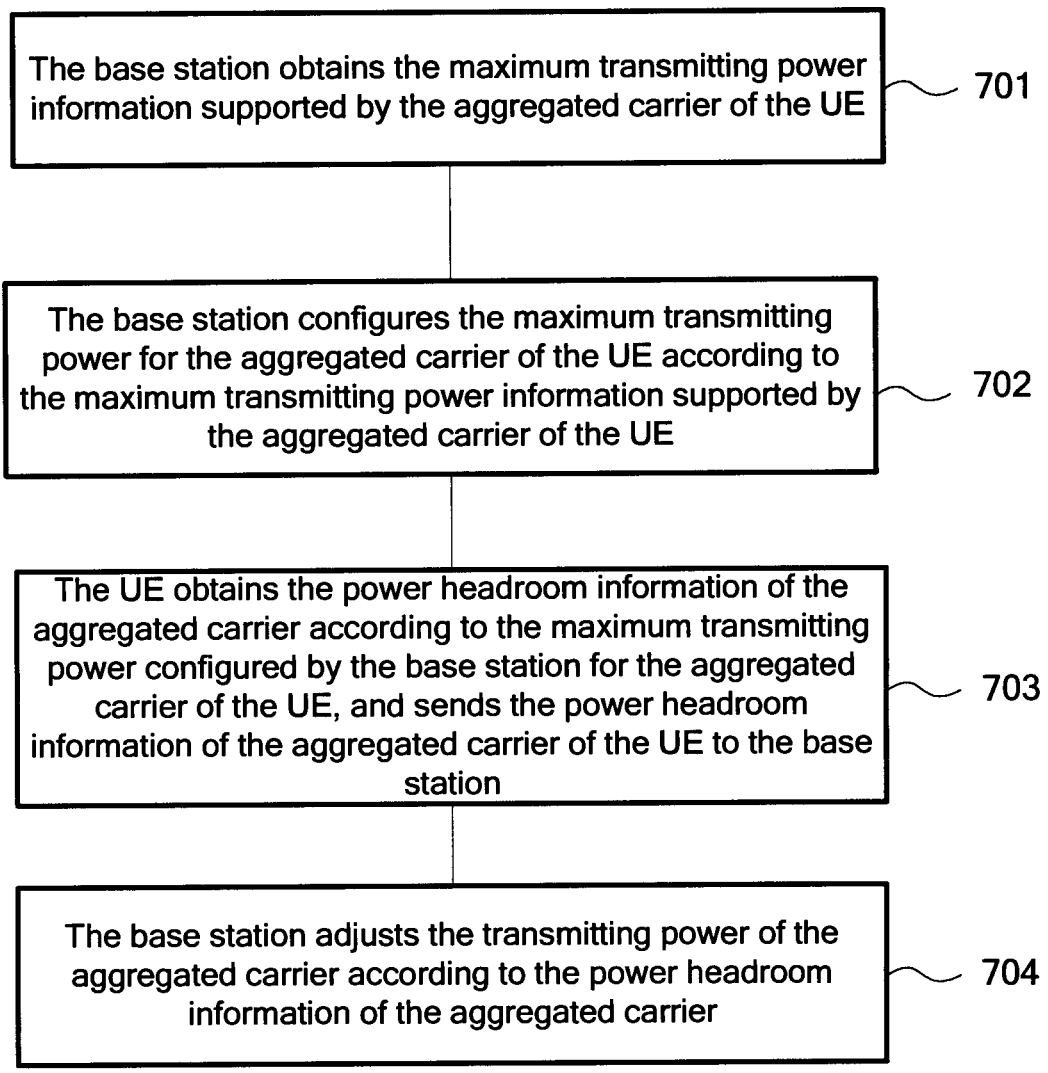
FIG. 7 is a flowchart of another power control method provided in an embodiment of the present invention.

The following describes a power control method provided in an embodiment of the present invention with reference to FIG. 7. As shown in FIG. 7, the method includes the following steps:

Step 701: The base station obtains the maximum transmitting power information supported by the aggregated carrier of the UE.

In step 701, the UE may send the maximum transmitting power information supported by the aggregated carrier of the UE to the base station, and the base station can obtain the maximum transmitting power information supported by the aggregated carrier of the UE by receiving information such as system configuration information.

The aggregated carrier of the UE may be of different granularities. Specifically, it may be aggregated carrier that is aggregated on the same antenna, or aggregated carrier that is attributable to the same power amplifier, or aggregated carrier that is attributable to the same band. For more details, see the embodiments described above.

Step 702: The base station configures the maximum transmitting power for the aggregated carrier of the UE according to the maximum transmitting power information supported by the aggregated carrier of the UE.

The details of configuring the maximum transmitting power for the aggregated carrier of the UE according to the maximum transmitting power information supported by the aggregated carrier of the UE may be: according to the maximum transmitting power information supported by the aggregated carrier of the UE, the base station configures the maximum transmitting power for the single carriers in the aggregated carrier respectively, or configures a sum of the maximum transmitting power of the single carriers in the aggregated carrier. Preferably, the sum of the maximum transmitting power of single carriers in the aggregated carrier is less than the maximum transmitting power supported by the aggregated carrier of the UE.

Optionally, the foregoing configuration process may be: the base station configures the maximum transmitting power for the UE through a power control command.

Step 703: The UE obtains the power headroom information of the aggregated carrier according to the maximum transmitting power configured by the base station for the aggregated carrier of the UE, and sends the power headroom information of the aggregated carrier of the UE to the base station.

The UE may obtain the power headroom information of the aggregated carrier according to the maximum transmitting power of the aggregated carrier of different granularities. Specifically, the aggregated carrier may be aggregated on the same antenna, and the UE may subtract estimated transmitting power of an antenna of the UE from the maximum transmitting power of the aggregated carrier which are aggregated on the same antenna, use the result of the subtraction as the power headroom information of the aggregated carrier, and send the power headroom information to the base station.

Similarly, the base station may obtain the power headroom information of the aggregated carrier of different granularities, for example, aggregated carrier that is attributable to the same band or the same power amplifier. For the detailed obtaining process, see the embodiments described above.

Step 704: The base station adjusts the transmitting power of the aggregated carrier according to the power headroom information of the aggregated carrier.

This step is similar to step 204.

The power reporting method in this embodiment improves flexibility of power control. Moreover, because the sum of the maximum transmitting power configured by the base station for the aggregated carrier is less than the maximum transmitting power supported by the aggregated carrier of the UE, the UE never enters a power restriction state, which ensures reliable sending of data.

Figure 8:
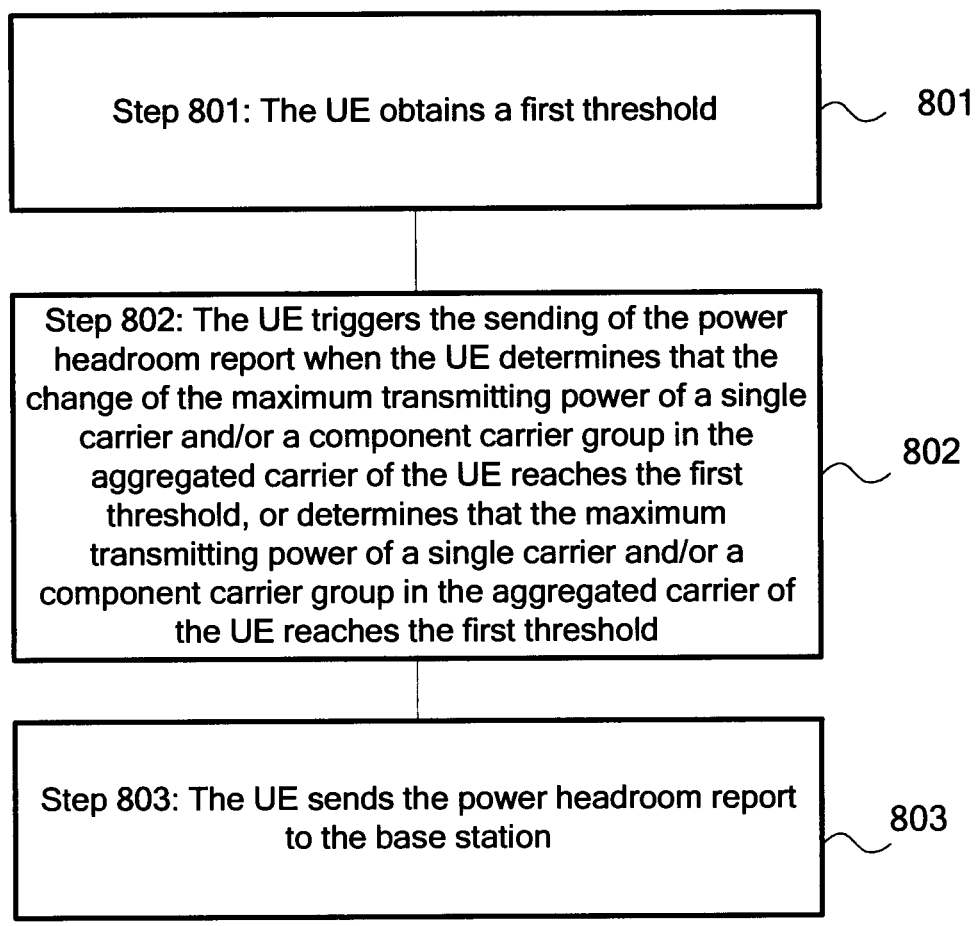
FIG. 8 shows a method for reporting power headroom provided in an embodiment of the present invention.

The following describes a method for reporting power headroom with reference to FIG. 8. The method includes the following steps:

Step 801: The UE obtains a first threshold. The first threshold is used to trigger reporting of the power headroom information of the aggregated carrier of the UE.

Specifically, the aggregated carrier of the UE may include at least one component carrier group and at least one first carrier, or include at least one component carrier group, or include at least two first carriers, the component carrier group includes at least two second carriers, and the first carrier and the second carrier are single carriers.

The first threshold may be a change of the maximum transmitting power of a single carrier in the aggregated carrier of the UE and/or a change of the maximum transmitting power of a component carrier group in the aggregated carrier of the UE. The change of the maximum transmitting power of the aggregated carrier of the UE may be an increasing value or a decreasing value.

The first threshold may also be the value of the maximum transmitting power of single carrier and/or component carrier group in the aggregated carrier of the UE.

The first threshold may be configured by the base station for the UE, namely, for at least one single carrier and/or at least one component carrier group of the UE.

The single carrier in the aggregated carrier of the UE may be single carrier that belong to no component carrier group, or single carrier that belong to a component carrier group.

In an embodiment, the maximum transmitting power of each single carrier in the aggregated carrier of the UE may be the smaller one of the maximum transmitting power configured by the base station for each single carrier included in the aggregated carrier of the UE and nominal maximum transmitting power of the UE, or any value that falls between the upper limit of the maximum transmitting power and the lower limit of the maximum transmitting power, or the maximum transmitting power of the current timeslot of the first carrier or the second carrier, or maximum transmitting power determined by other calculation methods, which is not limited in this embodiment.

Step 802: The UE triggers the sending of a power headroom report when the UE determines that the change of the maximum transmitting power of a single carrier and/or a component carrier group in the aggregated carrier of the UE reaches the first threshold, or determines that the value of the maximum transmitting power which is changed of a single carrier and/or a component carrier group in the aggregated carrier of the UE reaches the first threshold.

Specifically, the UE may determine the change of the maximum transmitting power of a single carrier in the aggregated carrier of the UE is greater than or equal to the first threshold. For example, upon determining that the increase or decrease of the maximum transmitting power of a single carrier in the aggregated carrier of the UE is greater than or equal to the first threshold, and the UE triggers sending of the power headroom report; or, upon determining that the value of the maximum transmitting power which is changed of a single carrier in the aggregated carrier of the UE is greater than or equal to the first threshold, and the UE triggers sending of the power headroom report; or, upon determining that the value of the maximum transmitting power which is changed of a single carrier in the aggregated carrier of the UE is less than or equal to the first threshold, and the UE triggers sending of the power headroom report.

The UE may determine the change of the maximum transmitting power of a component carrier group in the aggregated carrier of the UE is greater than or equal to the first threshold. For example, upon determining that the increase or decrease of the maximum transmitting power of a component carrier group in the aggregated carrier of the UE is greater than or equal to the first threshold, and the UE triggers sending of the power headroom report; or, upon determining that the value of the maximum transmitting power which is changed of a component carrier group in the aggregated carrier of the UE is greater than or equal to the first threshold, and the UE triggers sending of the power headroom report; or, upon determining that the value of the maximum transmitting power which is changed of a component carrier group in the aggregated carrier of the UE is less than or equal to the first threshold, and the UE triggers sending of the power headroom report. The maximum transmitting power of the component carrier group is equivalent to the maximum transmitting power of the component carrier group in the foregoing embodiments, or may be the maximum transmitting power of the component carrier group attribute. For example, the maximum transmitting power of the component carrier group may be: a sum of the maximum transmitting power of the second carriers in the component carrier group; or the smaller one of the sum of the maximum transmitting power of the second carriers in the component carrier group and the nominal maximum transmitting power of the UE.

In step 801, when the first threshold is configured for the UE, the first threshold may be configured for all single carriers in the aggregated carrier of the UE, the first threshold may be configured for at least one single carrier and/or at least one component carrier group.

The maximum transmitting power mentioned above may be the maximum transmitting power of the current transmission timeslot, or a weighted average of the maximum transmitting power of the current transmission timeslot and history transmission timeslots. For example, the maximum transmitting power may be the maximum transmitting power of the current transmission timeslot of a single carrier in the aggregated carrier of the UE, or a weighted average of the maximum transmitting power of the current transmission timeslot and history transmission timeslots of a single carrier in the aggregated carrier of the UE. In another example, the maximum transmitting power may be the maximum transmitting power of the current timeslot of a component carrier group in the aggregated carrier of the UE, or a weighted average of the maximum transmitting power of the current transmission timeslot and history transmission timeslots of a component carrier group in the aggregated carrier of the UE.

In an embodiment of the present invention, different threshold values may be configured for different single carriers in the aggregated carrier of the UE, and different threshold values may be configured for different component carrier groups. The threshold of a single carrier may be the same as or different from the threshold of a component carrier group.

The reporting of power headroom may be triggered by either a single carrier in the aggregated carrier of the UE or a component carrier group in the aggregated carrier of the UE, or by both of them.

The triggered power headroom report mentioned above may be the power headroom report of at least one single carrier in the aggregated carrier, and/or power headroom report of at least one component carrier group.

Step 803: The UE sends the power headroom report to the base station.

The UE may send the power headroom report at the current transmission timeslot or a subsequent transmission timeslot.

For details of the maximum transmitting power of the aggregated carrier of the UE, see the description in the foregoing embodiments.

The method for triggering reporting of power headroom in this embodiment enables reporting of power headroom in a scenario of an aggregated carrier.

Figure 9:
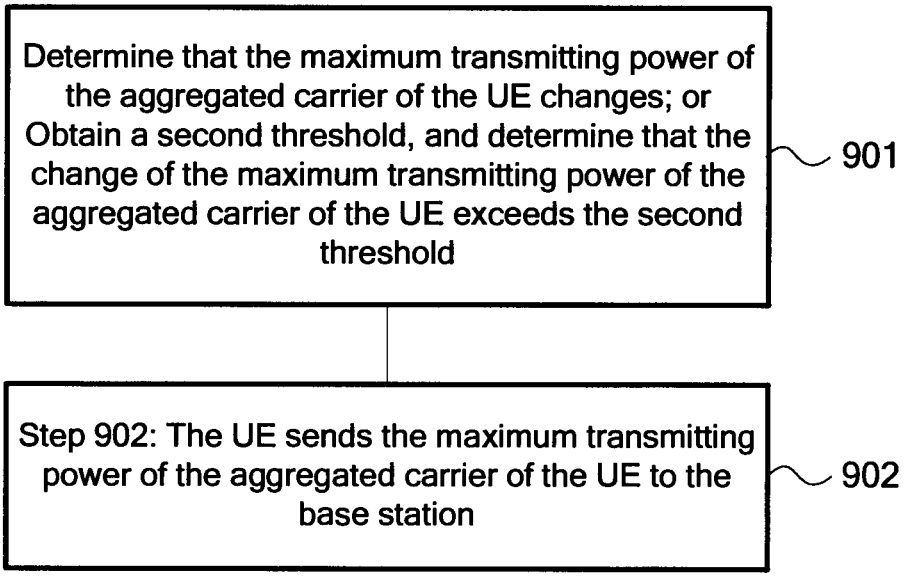
FIG. 9 shows a method for reporting maximum transmitting power provided in an embodiment of the present invention.

The following describes a method for reporting the maximum transmitting power with reference to FIG. 9. The method includes the following steps:

Step 901: The UE determines that the maximum transmitting power of the aggregated carrier of the UE changes; or The UE obtains a second threshold, and determines that the change of the maximum transmitting power of the aggregated carrier of the UE exceeds the second threshold.

The maximum transmitting power of the aggregated carrier of the UE may be the maximum transmitting power of a single carrier in the aggregated carrier, or the maximum transmitting power of a component carrier group in the aggregated carrier. The maximum transmitting power of the aggregated carrier of the UE is equivalent to the maximum transmitting power of the component carrier group mentioned in the foregoing embodiments, and may also be the maximum transmitting power of a component carrier group attribute. The second threshold may be configured by a base station. Optionally, the base station configures the second threshold through wireless resource control messages.

Step 902: The UE sends the maximum transmitting power of the aggregated carrier of the UE to the base station.

The maximum transmitting power of the aggregated carrier of the UE may be the maximum transmitting power of at least one single carrier and/or at least one component carrier group in the aggregated carrier of the UE, and may also be the maximum transmitting power of the aggregated carrier attribute.

After receiving the maximum transmitting power of the aggregated carrier of the UE, the base station keeps using the maximum transmitting power of the aggregated carrier of the UE. Once a second maximum transmitting power of the aggregated carrier of the UE is received subsequently, the base station uses the second maximum transmitting power instead.

In an embodiment of the present invention, the base station may request the UE to report the maximum transmitting power of at least one single carrier in the aggregated carrier of the UE. Optionally, the base station may send the request through an RRC or MAC message.

Through the method for reporting the maximum transmitting power in this embodiment, the UE does not need to always report the maximum transmitting power on every occasion of reporting the power headroom information, and signaling is saved.

Figure 10:
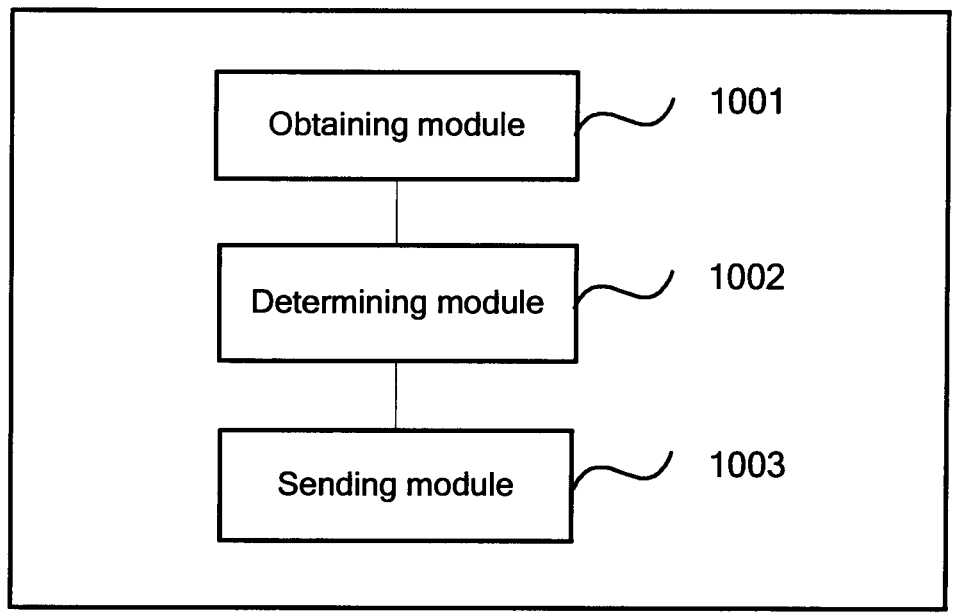
FIG. 10 is a schematic structure diagram of a UE provided in an embodiment of the present invention.

The following describes a UE provided in an embodiment of the present invention with reference to FIG. 10. The UE includes:

an obtaining module 1001, configured to obtain a first threshold;

a determining module 1002, configured to determine that the change of the maximum transmitting power of the aggregated carrier of the UE is greater than or equal to the first threshold, or determine that the value of the maximum transmitting power of the aggregated carrier of the UE is greater than or equal to the first threshold, or determine that the value of the maximum transmitting power which is changed of the aggregated carrier of the UE reaches the first threshold; and a sending module 1003, configured to send a power headroom report to the base station when the determining module 1002 determines that the change of the maximum transmitting power of the aggregated carrier of the UE is greater than or equal to the first threshold, or determines that the value of the maximum transmitting power of the aggregated carrier of the UE is greater than or equal to the first threshold, or determines that the value of the maximum transmitting power which is changed of the aggregated carrier of the UE reaches the first threshold.

The UE further includes:

a configuring module, configured to configure the first threshold for at least one of the following items:

the first carrier, the second carrier, and the component carrier group.

The aggregated carrier of the UE include at least one component carrier group and at least one first carrier, or include at least one component carrier group, or include at least two first carriers, the component carrier group includes at least two second carriers, and the first carrier and the second carrier are single carriers.

The maximum transmitting power of the aggregated carrier of the UE is at least one of the following items:

the maximum transmitting power of the first carrier or the maximum transmitting power of the second carrier; and the maximum transmitting power of the component carrier group.

The maximum transmitting power of the first carrier or the maximum transmitting power of the second carrier includes:

the maximum transmitting power of the current transmission timeslot of the first carrier or the second carrier; or a weighted average of the maximum transmitting power of the current transmission timeslot and the previous transmission timeslot of the first carrier or the second carrier.

The maximum transmitting power of the component carrier group includes:

the maximum transmitting power of the current transmission timeslot of the component carrier group; or a weighted average of the maximum transmitting power of the current transmission timeslot and the previous transmission timeslot of the component carrier group.

The maximum transmitting power of the first carrier or the second carrier includes:

the smaller one of the maximum transmitting power configured by the base station for the first carrier and the nominal maximum transmitting power of the UE, or the smaller one of the maximum transmitting power configured by the base station for the second carrier and the nominal maximum transmitting power of the UE; or any value between the upper limit and the lower limit of the maximum transmitting power.

The maximum transmitting power of the component carrier group includes:

a sum of the maximum transmitting power of the second carriers included in the component carrier group; or the smaller one of the sum of the maximum transmitting power of the second carriers included in the component carrier group and the nominal maximum transmitting power of the UE.

For detailed characteristics of the UE provided in the embodiment of the present invention, see the description in the foregoing method embodiments.

The method for triggering reporting of power headroom in this embodiment enables reporting of power headroom in a scenario of an aggregated carrier.

Figure 11:
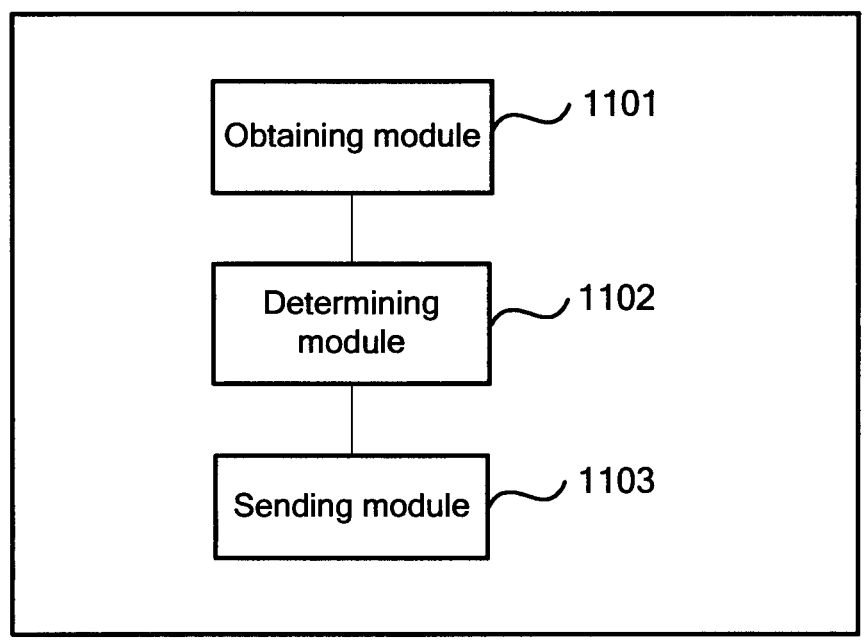
FIG. 11 is a schematic structure diagram of another UE provided in an embodiment of the present invention.

The following describes a UE provided in an embodiment of the present invention with reference to FIG. 11. The UE includes:

a determining module 1102, configured to determine that the maximum transmitting power of the aggregated carrier of the UE changes;

a sending module, configured to send the maximum transmitting power of the aggregated carrier of the UE to the base station when the determining module 1102 determines that the maximum transmitting power of the aggregated carrier of the UE changes; or an obtaining module 1101, configured to obtain a second threshold.

The determining module 1102 is further configured to determine that the change of the maximum transmitting power of the aggregated carrier of the UE exceeds the second threshold;

The sending module 1103 is further configured to send the maximum transmitting power of the aggregated carrier of the UE to the base station when the determining module determines that the change of the maximum transmitting power of the aggregated carrier of the UE exceeds the second threshold.

The aggregated carrier of the UE include at least one component carrier group and at least one first carrier, or include at least one component carrier group, or include at least two first carriers, the component carrier group includes at least two second carriers, and the first carrier and the second carrier are single carriers.

The maximum transmitting power of the aggregated carrier of the UE is at least one of the following items:

the maximum transmitting power of the first carrier or the maximum transmitting power of the second carrier; and the maximum transmitting power of the component carrier group.

The maximum transmitting power of the first carrier or the maximum transmitting power of the second carrier includes:

the smaller one of the maximum transmitting power configured by the base station for the first carrier and the nominal maximum transmitting power of the UE, or the smaller one of the maximum transmitting power configured by the base station for the second carrier and the nominal maximum transmitting power of the UE; or any value between the upper limit and the lower limit of the maximum transmitting power.

The maximum transmitting power of the component carrier group includes:

a sum of the maximum transmitting power of the second carriers included in the component carrier group; or the smaller one of the sum of the maximum transmitting power of the second carriers included in the component carrier group and the nominal maximum transmitting power of the UE.

For detailed characteristics of the UE provided in the embodiment of the present invention, see the description in the foregoing method embodiments.

Through the method for reporting the maximum transmitting power in this embodiment, the UE does not need to always report the maximum transmitting power on every occasion of reporting the power headroom information, and signaling is saved.

Those skilled in the art should understand that the modules of the apparatus provided in the embodiments of the present invention are described by their functions, and the specific structure may be some divisions or combinations of such functional modules.

In the embodiments of the present invention, the word "receive" refers to obtaining information from another unit actively or receiving information sent by another unit.

The serial number of any embodiment above is for ease of description only, but does not represent preference of the embodiment.

The solutions specified in the appended claims herein are also covered in the protection scope of the present invention.

Persons of ordinary skill in the art understand that all or part of the steps of the method in any embodiment of the present invention may be implemented by a program instructing relevant hardware. The program may be stored in computer-readable storage media.

The above descriptions are merely exemplary embodiments of the present invention, but are not intended to limit the scope of the present invention. Any modification, equivalent replacement, or improvement made without departing from the spirit and principles of the present invention shall fall within the protection scope of the present invention.

What is claimed is:

1. A method for power control, wherein an aggregated carrier of a user equipment (UE) comprises at least two first carriers, wherein the method comprises:

obtaining, by a base station, power headroom information of each of the at least two first carriers of the UE on one carrier among the at least two first carriers, wherein each of the first carriers is a single carrier; and adjusting, by the base station, transmitting power of the aggregated carrier according to the power headroom information;

wherein the power headroom information of each of the at least two first carriers comprises:

a difference between the maximum transmitting power of each of the at least two first carriers and an estimated transmitting power of the corresponding first carrier of the at least two first carriers;

wherein the difference between the maximum transmitting power of each of the at least two first carriers and an estimated transmitting power of the corresponding first carrier of the at least two first carriers comprises:

the difference between the maximum transmitting power of at least one first carrier of the at least two first carriers and a sum of transmitting power of a control channel of the corresponding carrier and transmitting power of a data channel of the corresponding carrier; and the difference between the maximum transmitting power of another at least one first carrier of the at least two first carriers and transmitting power of a data channel of the corresponding carrier.

2. The method according to claim 1, wherein the aggregated carrier is aggregated on the same antenna of the UE, or aggregated on the same power amplifier of the UE, or related to the same band of the UE.

3. The method according to claim 1, wherein before the obtaining, by the base station, the power headroom information of each of the at least two first carriers of the UE on one first carrier among the at least two first carriers, the method further comprises:

sending, by the base station, first indication information to the UE, wherein the first indication information comprises first maximum transmitting power information of each of the at least two first carriers of the UE configured by the base station.

4. A base station, wherein the base station communicates with a user equipment (UE), wherein an aggregated carrier of the UE comprises at least two first carriers, wherein the base station comprises:

a receiving unit, configured to receive power headroom information of each of at least two first carriers of the UE on one first carrier among the at least two first carriers, wherein each of the first carriers is a single carrier; and a power adjusting unit, configured to adjust transmitting power of the aggregated carrier according to the power headroom information;

wherein the power headroom information of each of the at least two first carriers comprises:

a difference between the maximum transmitting power of each of the at least two first carriers and an estimated transmitting power of the corresponding first carrier of the at least two first carriers;

wherein the difference between the maximum transmitting power of each of the at least two first carriers and an estimated transmitting power of the corresponding first carrier of the at least two first carriers comprises:

the difference between the maximum transmitting power of at least one first carrier of the at least two first carriers and a sum of transmitting power of a control channel of the corresponding carrier and transmitting power of a data channel of the corresponding carrier;

and the difference between the maximum transmitting power of another at least one first carrier of the at least two first carriers and transmitting power of a data channel of the corresponding carrier.

5. The base station according to claim 4, further comprising:
a transmitting unit, configured to transmit first indication information to the UE, wherein the first indication information comprises first maximum transmitting power information of each of the at least two first carriers of the UE configured by the base station.

6. The base station according to claim 4, wherein
the aggregated carrier is aggregated on the same antenna of the UE, or aggregated on the same power amplifier of the UE, or related to the same band of the UE.

7. A method for power control, wherein an aggregated carrier of a user equipment (UE) comprises at least two first carriers, wherein the method comprises:
generating, by the UE, power headroom information of each of the at least two first carriers of the UE on one first carrier among the at least two first carriers, wherein each of the first carriers is a single carrier; and
transmitting, by the UE, the power headroom information to a base station for adjusting transmitting power of the aggregated carrier according to the power headroom information;
wherein the power headroom information of each of the at least two first carriers comprises:
a difference between the maximum transmitting power of each of the at least two first carriers and an estimated transmitting power of the corresponding first carrier of the at least two first carriers;
wherein the difference between the maximum transmitting power of each of the at least two first carriers and an estimated transmitting power of the corresponding first carrier of the at least two first carriers comprises:
the difference between the maximum transmitting power of at least one first carrier of the at least two first carriers and a sum of transmitting power of a control channel of the corresponding carrier and transmitting power of a data channel of the corresponding carrier, if the control channel and the data channel are capable of sending information simultaneously; and
the difference between the maximum transmitting power of another at least one first carrier of the at least two first carriers and transmitting power of a data channel of the corresponding carrier.

8. The method according to claim 7, wherein
the aggregated carrier is aggregated on the same antenna of the UE, or aggregated on the same power amplifier of the UE, or related to the same band of the UE.

9. The method according to claim 7, further comprising:
receiving, by the UE, first indication information from the base station, wherein the first indication information comprises first maximum transmitting power information of each of the at least two first carriers of the UE configured by the base station;
obtaining, by the UE, the maximum transmitting power of each of the at least two first carriers according to the first maximum transmitting power information and second maximum transmitting power information of the each of the at least two first carriers supported by the UE;
calculating, by the UE, the power headroom of each of the at least two first carriers according to the maximum transmitting power of each of the at least two first carriers and the estimated transmitting power of the corresponding first carrier of the at least two first carriers.

10. The method according to claim 9, the obtaining, by the UE, the maximum transmitting power of each of the at least two first carriers according to the first maximum transmitting power information and second maximum transmitting power information of the each of the at least two first carriers supported by the UE, comprises:
obtaining, by the UE, a following value as the maximum transmitting power of each of the at least two first carriers: the smaller one of the maximum transmitting power configured by the base station for each of the at least two first carriers of the UE and a nominal maximum transmitting power of the UE.

11. A user equipment (UE), wherein an aggregated carrier of the UE comprises at least two first carriers, wherein the UE comprises:
a processor, configured to generate power headroom information of each of the at least two first carriers of the UE on one first carrier among the at least two first carriers, wherein each of the first carriers is a single carrier; and
a transmitting unit, configured to transmit the power headroom information to a base station for adjusting transmitting power of the aggregated carrier according to the power headroom information;
wherein the power headroom information of each of the at least two first carriers comprises:
a difference between the maximum transmitting power of each of the at least two first carriers and an estimated transmitting power of the corresponding first carrier of the at least two first carriers;
wherein the difference between the maximum transmitting power of each of the at least two first carriers and an estimated transmitting power of the corresponding first carrier of the at least two first carriers comprises:
the difference between the maximum transmitting power of at least one first carrier and a sum of transmitting power of a control channel of the corresponding carrier and transmitting power of a data channel of the corresponding carrier; and
the difference between the maximum transmitting power of another at least one first carrier of the at least two first carriers and transmitting power of a data channel of the corresponding carrier.

12. The UE according to claim 11, wherein
the aggregated carrier is aggregated on the same antenna of the UE, or aggregated on the same power amplifier of the UE, or related to the same band of the UE.

13. The UE according to claim 11, further comprising:
a receiving unit, configured to receive first indication information from the base station, wherein the first indication information comprises first maximum transmitting power information of each of the at least two first carriers of the UE configured by the base station;
and the processor comprises:
a first calculating unit, configured to calculate the maximum transmitting power of each of the at least two first carriers according to the first maximum transmitting power information and second maximum transmitting power information of the each of the at least two first carriers supported by the UE; and
a second calculating unit, configured to calculate the power headroom of each of the at least two first carriers according to the maximum transmitting power of each of the at least two first carriers and the estimated transmitting power of the corresponding first carrier of the at least two first carriers.

14. The UE according to claim 13, wherein
the first calculating unit is configured to calculate a following value as the maximum transmitting power of each of the at least two first carriers: the smaller one of the maximum transmitting power configured by the base station for each of the at least two first carriers of the UE and a nominal maximum transmitting power of the UE.

* * * * *

UNITED STATES PATENT AND TRADEMARK OFFICE
CERTIFICATE OF CORRECTION

PATENT NO. : 8,700,086 B2
APPLICATION NO. : 13/289480
DATED : April 15, 2014
INVENTOR(S) : Han et al.

It is certified that error appears in the above-identified patent and that said Letters Patent is hereby corrected as shown below:

In the Specification

In Col. 1, lines 4-17, Cross-Reference to Related Applications, replace paragraph with: --This application is a continuation of International Application No. PCT/CN2010/079935, filed on December 17, 2010. The International Application claims priorities to Chinese Patent Application No. 200910238852.3, filed on December 30, 2009 and Chinese Patent Application No. 201010002390.8, filed on January 8, 2010. This application also claims priority to Chinese Patent Application No. 201010533454.7, filed on November 5, 2010. All of above-mentioned applications are hereby incorporated by reference in their entireties.--

Signed and Sealed this
First Day of March, 2016

Michelle K. Lee
*Director of the United States Patent and Trademark Office*